US009003271B2

(12) United States Patent
Jung (10) Patent No.: US 9,003,271 B2
(45) Date of Patent: Apr. 7, 2015

(54) ERROR DETECTING DEVICE AND METHOD OF A DUAL CONTROLLER SYSTEM (75) Inventor: Ji-Hun Jung, Seoul (KR)

(73) Assignee: Daesung Electric Co., Ltd., Ansan-si (KR)

( * ) Notice: Subject to any disclaimer, the term of this patent is extended or adjusted under 35 U.S.C. 154(b) by 4 days.

(21) Appl. No.: 13/511,129

(22) PCT Filed: Jul. 6, 2011

(86) PCT No.: PCT/KR2011/004925
§ 371 (c)(1),
(2), (4) Date: May 21, 2012

(87) PCT Pub. No.: WO2012/169687
PCT Pub. Date: Dec. 13, 2012

(65) Prior Publication Data
US 2014/0108896 A1  Apr. 17, 2014

(30) Foreign Application Priority Data

Jun. 7, 2011  (KR) .................. 10-2011-0054381
Jun. 7, 2011  (KR) .................. 10-2011-0054382

(51) Int. Cl.
*G06F 7/02* (2006.01)
*G06F 11/08* (2006.01)

(52) U.S. Cl.
CPC ..................................... *G06F 11/08* (2013.01)

(58) Field of Classification Search
CPC ....... G06F 11/10; G06F 7/02; G06F 11/0751; H05K 999/99; H04L 1/0061
USPC .......................................................... 714/819
See application file for complete search history.

(56) References Cited

U.S. PATENT DOCUMENTS

| 6,111,888 | A  | * | 8/2000 | Green et al. | ............... 370/461 |
| 8,049,510 | B2 | * | 11/2011 | Queck | .......................... 324/522 |
| 2001/0046289 | A1 | * | 11/2001 | Robinson et al. | ............. 379/414 |
| 2001/0051845 | A1 |   | 12/2001 | Itoh | |
| 2002/0010802 | A1 | * | 1/2002 | Kang et al. | .................... 709/253 |

(Continued)

FOREIGN PATENT DOCUMENTS

KR  1020100060111 A   7/2010
KR  1020110020429 A   3/2011

OTHER PUBLICATIONS

PCT/KR2011/004925 International Search Report English Translation, Date of Mailing: May 31, 2012.

*Primary Examiner* — Albert Decady
*Assistant Examiner* — Enam Ahmed
(74) *Attorney, Agent, or Firm* — Schmeiser, Olsen & Watts LLP (57) ABSTRACT An error detecting device of a dual controller system is provided. The first controller receives a sensing data from a sensor to calculate and generate a first data and outputs a final data if an error is not detected by comparing the first data with a second data transmitted from a second controller. The CAN transceiver receives the final data from the first controller and transmits the final data through a CAN bus. The second controller receives the sensing data from the sensor to calculate and generate a second data and transmits to the first controller an interrupt signal which prevents an output of the final data if an error is detected by comparing the second data with the final data fed back from the CAN transceiver. Accordingly, output transmission to the vehicle is controlled and the stability and reliability of the output data is increased.

14 Claims, 6 Drawing Sheets (56) References Cited

U.S. PATENT DOCUMENTS

\* cited by examiner

CAN MESSAGE FORMAT (In case of 7-Byte SENSOR DATA)

ERROR DETECTING DEVICE AND METHOD OF A DUAL CONTROLLER SYSTEM

TECHNICAL FIELD

The present invention relates to an error detecting device and method of a dual controller system and more particularly to an error detecting device and method of a dual controller system for calculating and processing steering angle data in a vehicle.

BACKGROUND ART

Generally, CAN (Controller Area Network) is a communication protocol for information exchange among on-board electronic control units (ECUs) used in an engine management system, an automatic transmission, an airbag system, an electronic stability program (ESP) and etc.

CAN protocol is a broadcasting protocol of a serial type with a very high level stability to be defined as ISO 11898 for a high speed and ISO 11519-2 for a low speed.

Such CAN protocol provides two message frame formats where CAN standard frame provides ID having a length of 11 bits and CAN extended frame provides ID of 29 bits.

However, if there is calculating error, system failure or dead lock when one MCU (Micro Control Unit) is used in a system operating in real time such as CAN, it is impossible to transmit data, so that a system requiring data in real time may recognize failure of data input as a defect or it may malfunction.

Especially, the real time data is required in a system which calculates and processes a steering angle data in a vehicle. Therefore, there have been studies to settle such an error by two sensor inputs and two MCUs with mutual control and synchronized communication in a steering angle computing system which requires the real time data.

Figure 1:
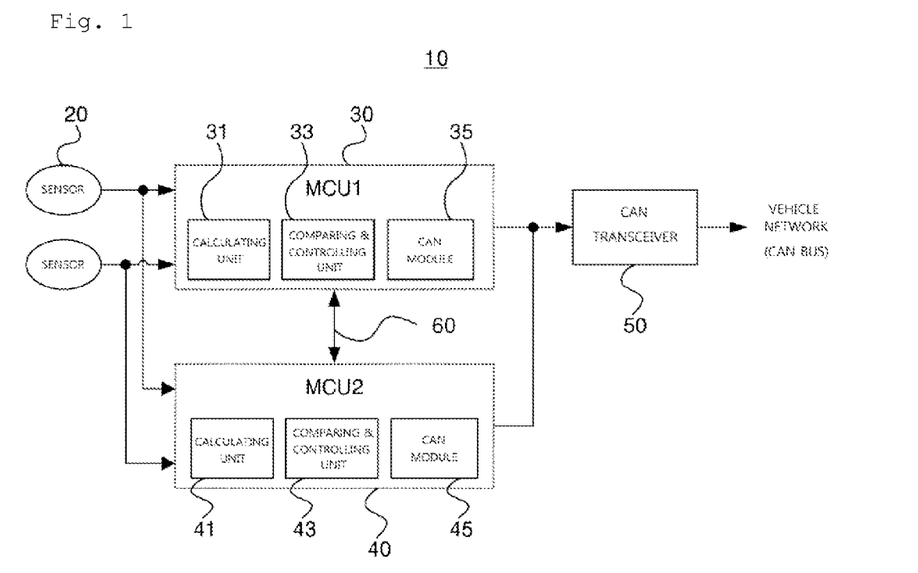
FIG. 1 is a constitutional diagram of a conventional dual controller system for computing steering angle.

Referring to FIG. 1, a conventional steering angle computing system 10 adopting a dual controller receives a sensing signal from sensor 20. Then, MCU1 30 and MCU2 40 of a dual constitution calculate a steering angle according to a predetermined algorithm and transmit it to other nodes (ECU: Electronic Control Unit) in a vehicle network through CAN bus. At this time, to transmit the calculated data (steering angle data), CAN modules 35 and 45 included in the MCU1 30 and MCU2 40 form the steering angle data into a message frame of CAN protocol and transmit to CAN bus through CAN transceiver 50. In error detection, if there is a problem in MCU1 30 and MCU2 40, an output error can be prevented by mutual comparison and mutual control through communication between MCUs.

However, according to the conventional art, when problems occur in CAN modules 35, 45 or data output calculating units 31, 41 for driving them even though verification results of comparing units 33, 43 are correct, there is no way to recognize a transmit of the error to the vehicle.

Especially, if the CAN modules 35, 45 cannot recognize a control authority which is received from the comparing/controlling units 33, 43 or if the CAN modules 35, 45 cannot be controlled due to an error of the comparing/controlling units 33, 43, a problem may occur because an error data, that is a prior input, is repeatedly transmitted to the vehicle.

Also, it is highly probable that the problems may continue because the comparing/controlling units 33, 43 cannot recognize them. Also, it cannot be recognized if there is a problem in an actual transmission state to the vehicle except for the information exchange through the communication between the MCUs. Also, if there is a problem in the synchronization, probability of the error rises because factors of the control authority depend on the communication between the MCUs. That is, it is hard to detect errors occurring at other components when there is no problem in the main control units.

Also, according to the conventional art, the values of the sensors 20 are compared to complement each other. Therefore, mutual calculations for the input values of the sensors 20 have to be performed at the same time in order for accurate comparing calculation of the comparing units. To this end, mutual synchronization is set using the communication between the MCUs. In this case, only if the communication between the MCUs is normally accomplished, a normal MCU can control to prevent impact on the vehicle when one of the two MCU has a problem.

However, when there is a problem in the communication between the controllers, a problem may occur between recognition of the communication problem and an output control, so that correct data may not be output. Also, though the transmission may be stopped when each MCU recognizes the communication error between the MCUs, a minor error such as delay in the mutual synchronization cannot be detected, so that there is a high probability of danger to be brought about due to a processing of wrong data.

DISCLOSURE

Technical Problem

Therefore, an object of the present invention is to provide an error detecting device and method of a dual controller system which can detect errors occurring at minor areas constituting a controller when calculating and processing steering angle data in a vehicle.

It is another object of the present invention to provide an error detecting device and method of a dual controller system which can detect data errors without communication between controllers when calculating and processing steering angle data in the vehicle.

Technical Solution

In order to accomplish the above object, the present invention provides an error detecting device of a dual controller system comprising: a first controller receiving a sensing data from a sensor to calculate and generate a first data and outputting a final data if an error is not detected by comparing the first data with a second data transmitted from a second controller; a CAN transceiver receiving the final data from the first controller and transmitting the final data through a CAN bus; and the second controller receiving the sensing data from the sensor to calculate and generate a second data and transmitting to the first controller an interrupt signal which prevents an output of the final data if an error is detected by comparing the second data with the final data fed back from the CAN transceiver.

According to an aspect of the present invention, the first controller comprises a first calculating unit which receives the sensing data and calculates and generates the first data, a first comparing and controlling unit which compares the first data with the second data to detect the error and transmits an output control signal to a first CAN module if the error is not detected, and the first CAN module which operates according to the output control signal, processes the first data according to a CAN protocol and transmits the final data.

According to an aspect of the present invention, the second controller comprises a second calculating unit which receives the sensing data and calculates and generates the second data, a second CAN module which processes the final data fed back from the CAN transceiver according to the CAN protocol and transmits a third data, a second comparing unit which compares the second data with the first data transmitted from the first controller to detect the error and compares the second data with the third data transmitted from the second CAN module to detect the error, and a second control unit which transmits the interrupt signal to the first controller if the error is detected at the second comparing unit.

According to an aspect of the present invention, the first comparing and controlling unit transmits the output control signal to the first CAN module if the error is not detected at the second comparing unit.

According to an aspect of the present invention, the error detecting device further comprises a first communication line connecting the first comparing and controlling unit and the second comparing unit to provide a transmitting line of an electrical signal; a second communication line connecting the first CAN module and the second control unit to provide a transmitting line of an electrical signal; and a feedback line feeding back the final data to the second CAN module.

According to an aspect of the present invention, the sensor is provided as plural and the first and the second controllers receive the sensing data from the plural sensors respectively.

According to an aspect of the present invention, an error detecting method of a dual controller system is provided which comprises receiving a sensing data from a sensor to calculate and generate a first data by a first controller; receiving a sensing data from the sensor to calculate and generate a second data by a second controller; comparing the first data with the second data transmitted from the second controller by the first controller and outputting a final data if an error is not detected; receiving the final data from the first controller and transmitting the final data through a CAN bus a CAN transceiver; and comparing the second data with the final data fed back from the CAN transceiver by the second controller and transmitting to the first controller an interrupt signal which prevents an output of the final data if an error is detected.

According to an aspect of the present invention, outputting the final data comprises comparing the first data and the second data by a first comparing and controlling unit to detect the error and transmitting an output control signal to a first CAN module if the error is not detected, and operating according to the output control signal by the first CAN module and processing the first data according to a CAN protocol to transmit the final data.

According to an aspect of the present invention, transmitting the interrupt signal comprises processing the final data fed back from the CAN transceiver according to the CAN protocol by a second CAN module and transmitting a third data, comparing the second data with the first data transmitted from the first controller to detect the error by a second comparing unit and comparing the second data with the third data transmitted from the second CAN module to detect the error, and transmitting the interrupt signal to the first controller by the second control unit if the error is detected by the second comparing unit.

According to an aspect of the present invention, transmitting the output control signal by the first comparing and controlling unit comprises transmitting the output control signal to the first CAN module if the error is not detected by the second comparing unit.

According to an aspect of the present invention, an error detecting device of a dual controller system is provided which comprises a first controller transmitting a first data including a sensing data received from a sensor and an indicator, identifying an error of the sensing data and transmitting a first off control signal if the error is detected; a second controller generating a second data by calculating a sensing data received from the sensor, synchronizing the second data and the first data on the basis of the indicator included in the first data which is fed back from the first controller, and transmitting a second off control signal if the error is detected by comparing the synchronized second data with the first data; a CAN transceiver receiving the first data from the first controller and transmitting it through a CAN bus; and an AND switching unit outputting an interrupt signal to deactivate the CAN transceiver if at least one of the first and the second off control signals is input.

According to an aspect of the present invention, the first controller comprises a first input unit receiving the sensing data from the sensor per first time unit, a first calculating unit receiving the sensing data and calculating to generate the first data, a first control unit sampling the first data to a predetermined times to detect the error and transmitting the first off control signal to the AND switching unit if the error is detected, and a first CAN module operating according to an output control signal of the first control unit and processing and outputting the first data according to a CAN protocol.

According to an aspect of the present invention, the second controller comprises a second input unit receiving the sensing data from the sensor per the first time unit, a second calculating unit receiving the sensing data and calculating to generate the second data, a second CAN module processing the first data fed back from the first CAN module according to the CAN protocol and outputting the first data per second time unit, a second comparing unit synchronizing the first data and the second data on the basis of the indicator and comparing the synchronized second data with the first data to detect the error, and a second control unit transmitting a second off control signal to the AND switching unit if the error is detected by the second comparing unit.

According to an aspect of the present invention, the first control unit transmits the output control signal to the first CAN module if the error is not detected.

According to an aspect of the present invention, the error detecting device further comprises a first CAN transceiver control line connecting the first control unit and a first input terminal of the AND switching unit to provide a transmitting line of the first off control signal; a second CAN transceiver control line connecting the second control unit and a second input terminal of the AND switching unit to provide a transmitting line of the second off control signal; and a feedback line feeding back the first data output from the first CAN module to the second CAN module.

According to an aspect of the present invention, the sensor is provided as plural and the first and the second controllers receive the sensing data from the plural sensors respectively.

According to an aspect of the present invention, an error detecting method of a dual controller system is provided which comprises transmitting a first data including a sensing data received from a sensor and an indicator, by a first controller, identifying an error of the sensing data and transmitting a first off control signal if the error is detected; generating a second data by calculating a sensing data received from the sensor, by a second controller, synchronizing the second data and the first data on the basis of the indicator included in the first data which is fed back from the first controller, and transmitting a second off control signal if the error is detected by comparing the synchronized second data with the first data; receiving the first data from the first controller by a CAN transceiver and transmitting it through a CAN bus; and outputting an interrupt signal by an AND switching unit to deactivate the CAN transceiver if at least one of the first and the second off control signals is input.

According to an aspect of the present invention, transmitting the first off control signal by the first controller comprises receiving the sensing data by a first input unit from the sensor per first time unit, receiving the sensing data by a first calculating unit and calculating to generate the first data including the indicator, sampling the first data by a first control unit to a predetermined times to detect the error and transmitting the first off control signal to the AND switching unit if the error is detected, and operating by a first CAN module according to an output control signal of the first control unit and processing and outputting the first data according to a CAN protocol.

According to an aspect of the present invention, transmitting the off control signal by the second controller comprises receiving the sensing data by a second input unit from the sensor per the first time unit, receiving the sensing data by a second calculating unit and calculating to generate the second data, processing the first data fed back from the first CAN module according to the CAN protocol by a second CAN module and outputting the first data per second time unit, synchronizing the first data and the second data on the basis of the indicator by a second comparing unit and comparing the synchronized second data with the first data to detect the error, and transmitting a second off control signal to the AND switching unit by a second control unit if the error is detected by the second comparing unit.

According to an aspect of the present invention, the error detecting method further comprises transmitting the output control signal to the first CAN module by the first control unit if the error is not detected.

Advantageous Effects

According to the error detecting device and method of a dual controller system of the present invention as described above, modules constituting the controller are divided into detail areas, and communication between controllers and final data output to outside are detected together so that output transmission to the vehicle is controlled if an error occurs in the areas. Also, a risk factor generated due to the error is verified in duplication to prevent output of dangerous data having errors, so that stability and reliability of the output data can be increased.

Also, according to the error detecting device and method of a dual controller system of the present invention as described above, each controller identifies an error of final data respectively without communication between the controllers. When there is an error in at least one controller, output transmission to the vehicle is controlled to prevent output of dangerous data having errors, so that stability and reliability of the data communication can be increased.

BEST MODE

The present invention may have various modifications and configurations and some exemplary embodiments are to be described in detail in this text. However, it is not to limit the present invention to specific configurations but to be understood to include all modification, equivalents and substitutions that are included in the sphere of the idea and technology of the present invention. Similar reference numerals are used for similar elements in describing the drawings. Although terms such as first, second and etc. can be used to describe various elements, such elements cannot be limited to those terms. Such terms are used only for distinguishing one element from another element. The terms used in this application are to be used for describing only one specific exemplary embodiment and not for limiting the present invention. A singular expression includes a plural expression unless it means obviously otherwise. In this application, the terms such as "include" or "consist" is to designate an existence of feature, number, step, action, element, part or combination thereof described in the specification and should be understood not to exclude beforehand an existence or possibility of addition of one or more other feature, step, action, element, part or combination thereof.

Unless defined otherwise, all terms used herein including technological and scientific terms have the same meaning as those generally understood by a person with ordinary skill in the art to which the present invention pertains. The terms generally used such as those defined in a dictionary is to be understood to have the same meaning as those which relevant technology has in the context, and is not to be understood as ideal or excessively formal meaning unless they are obviously defined in this application.

Hereinafter, referring to attached drawings, exemplary embodiments of the present invention are described in detail.

Figure 2:
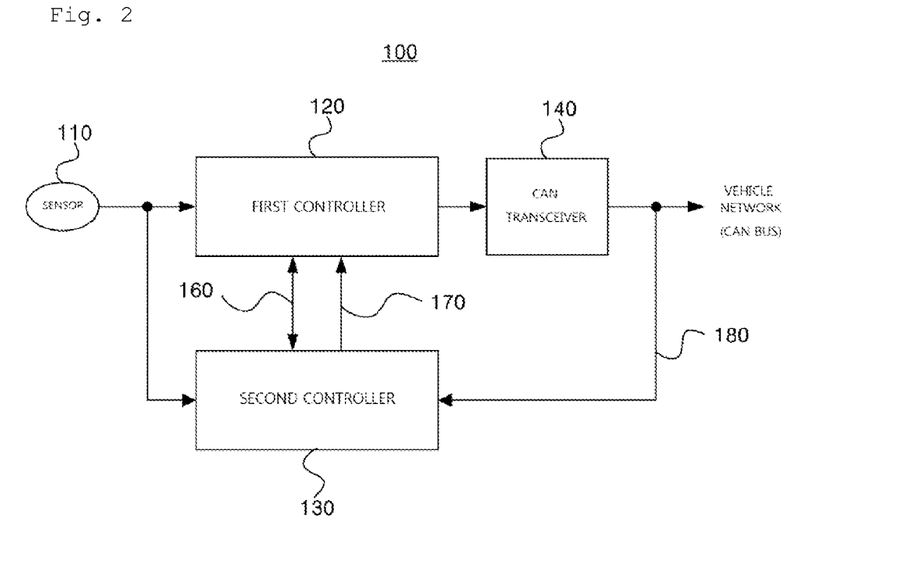
FIG. 2 is a schematic constitutional diagram of a dual controller system according to an exemplary embodiment of the present invention.

FIG. 2 is a schematic constitutional diagram of a dual controller system according to an exemplary embodiment of the present invention.

Referring to FIG. 2, an error detecting device 100 of the dual controller system according to the exemplary embodiment of the present invention comprises a first controller 120, a second controller 130 and a CAN transceiver 140. Also, it may further comprise a sensor 110, a first communication line 160, a second communication line 170 and a feedback line 180.

Although, in this exemplary embodiment, a real time calculating system is described for computing a steering angle of a steering wheel in a vehicle, the present invention is not limited to the system but may also be applied to various error detecting devices adopting a dual controller system.

The sensor 110 may be embodied as an AMR (Anisotropic Magneto Resistance) sensor for sensing the steering angle of the steering wheel. The sensor 110 may be provided as plural and the first and the second controllers 120, 130 may receive sensing data from a plurality of sensors respectively.

The first controller 120 receives the sensing data from the sensor 110 and calculates and generates a first data. The first controller 120 generates the first data according to a predetermined algorithm.

Also, the first controller 120 compares the first data with a second data transmitted from the second controller 130 and outputs a final data if an error is not detected. That is, if the compared difference between the first data and the second data exceeds a predetermined permitted limit, it is identified as an error. If the error is not identified, the first data is output as the final data.

The second controller 130 receives a sensing data from the sensor 110 and calculates and generates the second data. The second controller 130 generates the second data according to a predetermined algorithm which is the same as that of the first controller 120.

Also, if an error is identified by comparing the second data with the final data fed back from the CAN transceiver 140, the second controller 130 transmits an interrupt signal, which prevents an output of the final data, to the first controller 120. That is, if the compared difference between the second data and the final data exceeds a predetermined permitted limit, it is identified as an error. If the error occurs, the interrupt signal is transmitted to the first controller 120 to prevent the output of the final data.

The CAN transceiver 140 receives the final data from the first controller 120 and transmit it through CAN bus. That is, the CAN transceiver 140, as a data transmission device, transmits a final steering angle data where the error is not detected to a vehicle network.

The first communication line 160 is provided between the first controller 120 and the second controller 130. It is a transmission line for mutual comparison of the first data and the second data.

The second communication line 170 is provided between the first controller 120 and the second controller 130. It is a transmission line for transmitting the interrupt signal to the first controller 120.

The feedback line 180 diverges from an output terminal of the CAN transceiver 140 to connect to the second controller 130. It is a transmission line for feeding back the final data to the second controller 130.

The first controller 120 and the second controller 130 may exchange data through IPC (Inter Processor Communication) channel and operate in a manner of a master-slave. In this exemplary embodiment of the present invention, the first controller 120 is a master and the second controller 130 is a slave.

According to such an error detecting device of the dual controller system, modules constituting the controller are divided into detail areas, and communication between controllers and final data output to outside are detected together so that output transmission to the vehicle is controlled if an error occurs in the areas. Also, a risk factor generated due to the error is verified in duplication to prevent output of dangerous data having errors, so that stability and reliability of the output data can be increased.

Figure 3:
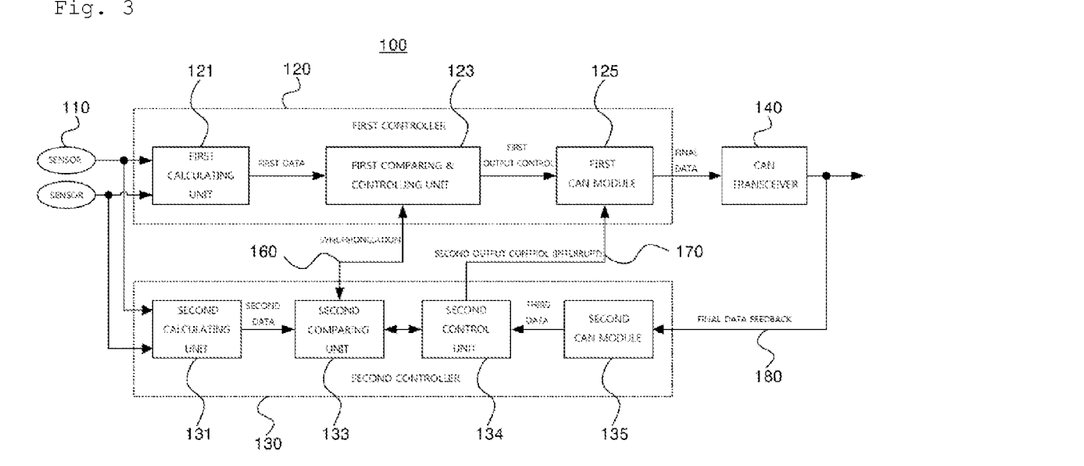
FIG. 3 is a detail constitutional diagram of the dual controller system according to the exemplary embodiment of the present invention.

FIG. 3 is a detail constitutional diagram of the dual controller system according to the exemplary embodiment of the present invention.

Referring to FIG. 3, the first controller 120 may comprise a first calculating unit 121, a first comparing and controlling unit 123 and a first CAN module 125.

The first calculating unit 121 receives the sensing data and calculates and generates the first data. That is, the first calculating unit 121 performs transforming a sensor value input from the sensor 110 into data recognizable by the controller through the calculating unit.

The first comparing and controlling unit 123 compares the first data with the second data to detect the error. If the error is not detected, it transmits an output control signal to the first CAN module 125.

Also, the first comparing and controlling unit 123, if the error is not detected by the second comparing unit 133, transmits the output control signal to the first CAN module 125. That is, the first comparing and controlling unit 123 and the second comparing unit 133 compare the first data and the second data with each other, and control the first CAN module 125 to perform a normal output if the error is not detected.

The first CAN module 125 operates according to the output control signal, processes the first data according to CAN protocol and transmits the final data. That is, whether the final data is output by the first CAN module 125 or not is controlled by both of the first comparing and controlling unit 123 and the second comparing unit 133.

The second controller 130 may comprise a second calculating unit 131, a second comparing unit 133, a second control unit 134 and a second CAN module 135.

The second calculating unit 131 receives the sensing data and calculates and generates the second data. That is, the second calculating unit 131 performs transforming a sensor value input from the sensor 110 into data recognizable by the controller through the calculating unit.

The second comparing unit 133 compares the second data with the first data transmitted from the first controller 120 to detect an error. Also, the second comparing unit 133 compares the second data with a third data transmitted from the second CAN module 134 to detect an error. In this case, the third data is a transformation of the final data to be recognizable by the controller.

The second control unit 134, if the error is detected by the second comparing unit 133, transmits the interrupt signal to the first controller 120. That is, the second control unit 134 compares the second data with the third data, which is the transformation of the fed back final data, and controls an output of the first CAN module 125 to perform a normal output if the error is not detected.

The second CAN module 135 processes the final data fed back from the CAN transceiver 140 according to the CAN protocol and transmits the third data. That is, the second CAN module 135 performs contrarily to the data transforming process of the first CAN module 125 to provide the second control unit 134 with the transformed third data.

In this case, the first communication line 160 connects the first comparing and controlling unit 123 and the second comparing unit 133 to provide a transmission line of electrical signal, the second communication line 170 connects the first CAN module 125 and the second control unit 134 to provide a transmission line of electrical signal, and the feedback line 180 feedbacks the final data output by the CAN transceiver 140 to the second CAN module 135.

This exemplary embodiment relates to the error detecting device for preventing wrong information from being transmitted to the vehicle when there is malfunction in a steering angle sensor for a vehicle used for transmitting the steering angle information to the vehicle, and its object is to prevent transmission of the output data if there is an error in certain module constituting the system.

For example, if there is a problem in the first calculating unit 121 and the second calculating unit 131 which are input terminals, the first comparing and controlling unit 123 and the second comparing unit 133 can compare with each other through the first communication line 160 and control each other to prevent an output error.

Also, although an impossible communication of the first communication line 160 can be recognized by a normal side of the first comparing and controlling unit 123 and the second comparing unit 133 to control the output if there is an error in one of them, only the control of the first comparing and controlling unit 123 is possible because one output terminal is used in this exemplary embodiment.

However, if both of the first comparing and controlling unit 123 and the second comparing unit 133 have errors, the output control of the second control unit 134 is possible by comparing with the input data through the second CAN module 135 because the first CAN module 125 transmits a prior input value to the vehicle. If the error occurs at the first CAN module 125, the output control is also possible by control of the second control unit 134.

If the errors occur at the second control unit 134 and the first comparing and controlling unit 123, all output control disappears, which corresponds to errors in both MCUs. Therefore, comparing the probability of software error to the probability of every error, the error output control is possible except for the software error in both MCUs.

Although, in general, a process for synchronization among the communication processes between the controllers is made by recognizing as the synchronization if a value within margin of error is calculated among samplings of the sensor input data, it is preferable in this exemplary embodiment that the recognized result value of the second control unit 134 is transmitted to the second comparing unit 133 and further transmitted to the first comparing and controlling unit 123 using the first communication line 160, and both of the second comparing unit 133 and the first comparing and controlling unit 123 perform the synchronization using a range transformation on the number of the samplings of the sensor input values.

For example, when both of the first comparing and controlling unit 123 and the second comparing unit 133 remember data at a point in time and the data at the next point in time are compared, if the data received from the second CAN module 135 at a prior point in time and the data remembered at the prior point in time are identical after comparison, the synchronization on the sensor value at the next point in time is performed. Of course, it is synchronization on the point in time of the sampling and the difference in the sensor data is synchronized by change in a range of the sampling data.

The first comparing and controlling unit 123 controls the first CAN module 125 by the comparison result through the first communication line 160, and the second comparing unit 133 controls the first comparing and controlling unit 123 through the first communication line 160 by the comparison result through the first communication line 160. However, in this case, if there is a problem in the first communication line 160 or in the first comparing and controlling unit 123, as the first CAN module 125 has no control right, the second control unit 134 controls the output of the first CAN module 125 using the second communication line 170 when failure is detected within a predetermined times by checking if there is a successful synchronization transmitted from the second comparing unit 133 and by comparing the transmitted calculating result value of the second calculating unit 131 and the data value received from the second CAN module 135.

The output control of the first comparing and controlling unit 123 may be performed generally using an Enable pin of the first CAN module 125. However, the output control of the second control unit 134 is performed using the Enable pin if a normal state is restored after the error occurs within a predetermined period of time. If the error is detected repeatedly for more than a predetermined period of time, an interrupt may be engaged to the first controller 120 to initialize and the second controller 130 itself may be initialized and re-operated.

Figure 4:
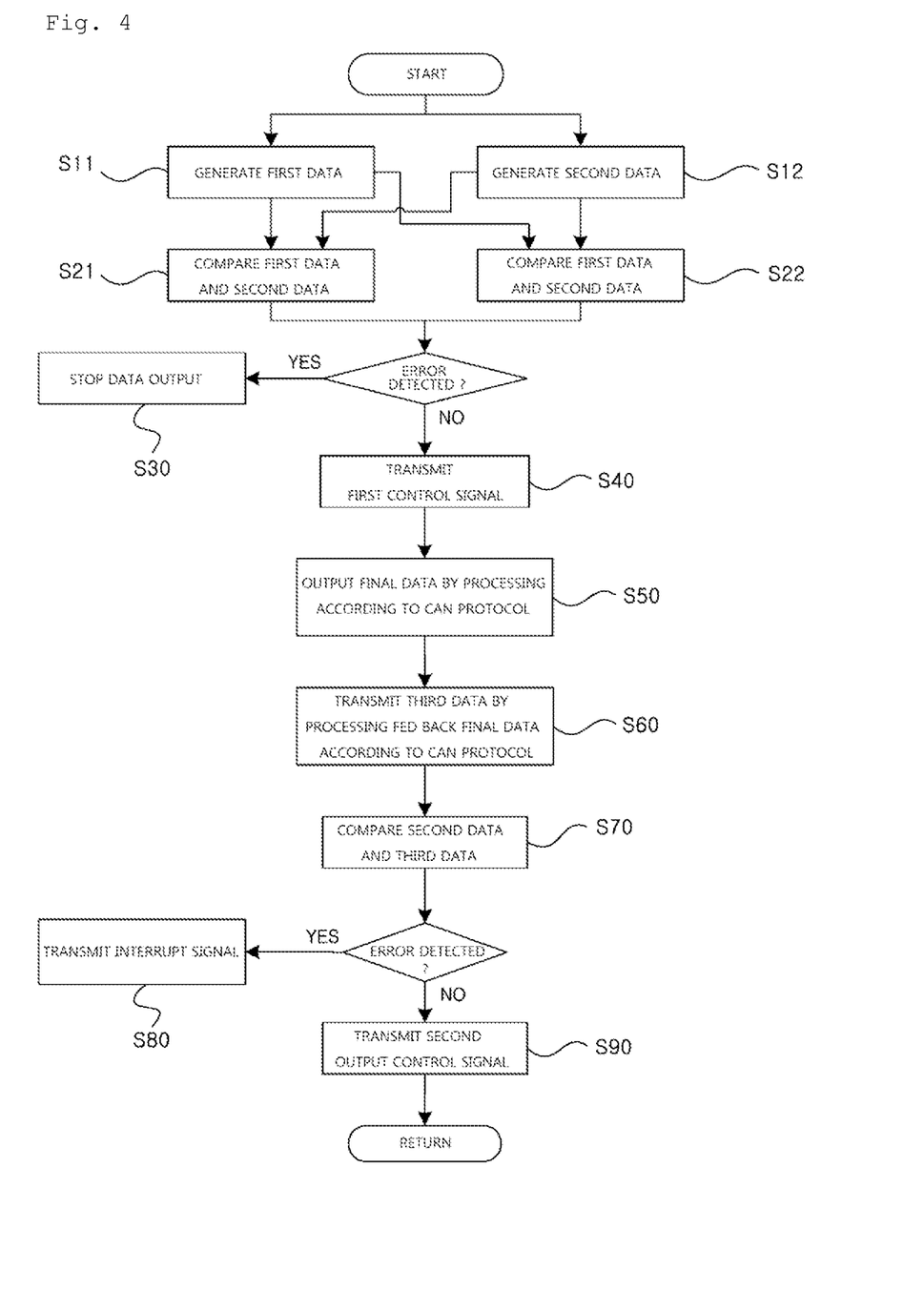
FIG. 4 is a flow diagram of an error detecting method of the dual controller system according to the exemplary embodiment of the present invention.

FIG. 4 is a flow diagram of an error detecting method of the dual controller system according to the exemplary embodiment of the present invention.

Referring to FIG. 4, according to the error detecting method of the dual controller system according to the exemplary embodiment of the present invention, the first calculating unit 121 receives the sensing data from the sensor 110 and calculates and generates the first data (S11). While the step S11 is performed, the second calculating unit 131 receives the sensing data from the sensor 110 and calculates and generates the second data (S12).

Next, the first controller 120 and the second controller 130 compare the first data and the second data respectively. That is, the first comparing and controlling unit 123 compares the first data and the second data transmitted from the second controller 130 (S21) and detects the error, the second comparing unit 133 compares the second data and the first data received from the first controller 120 (S22) and detects the error.

If the error is detected from at least one of the compared results from the steps S21 and S22, the first comparing and controlling unit 123 controls the first CAN module 125 to stop outputting the final data (S30). If the error is not detected from the steps S21 and S22, the first comparing and controlling unit 123 transmits the first output control signal to the first CAN module 125 (S40).

Next, the first CAN module 125 operates according to the output control signal and processes the first data according to the CAN protocol to output the final data (S50). The second CAN module 135 processes the final data fed back from the CAN transceiver 140 according to the CAN protocol to transmit the third data (S60).

Next, the second comparing unit 133 compares the second data with the third data transmitted from the second CAN module 135 (S70). If the error is detected from the compared result at the step S70, the second control unit 134 transmits the interrupt signal to prevent the output of the final data to the first CAN module 125 (S80). If the error is not detected from the compared result at the step S70, the second control unit 134 transmits the second output control signal to the final CAN module 125 (S90). That is, the first CAN module 125 maintains a normal operation by the first and the second output control signal. Finally, the step returns to S11 and S12 to repeat the above processes.

Figure 5:
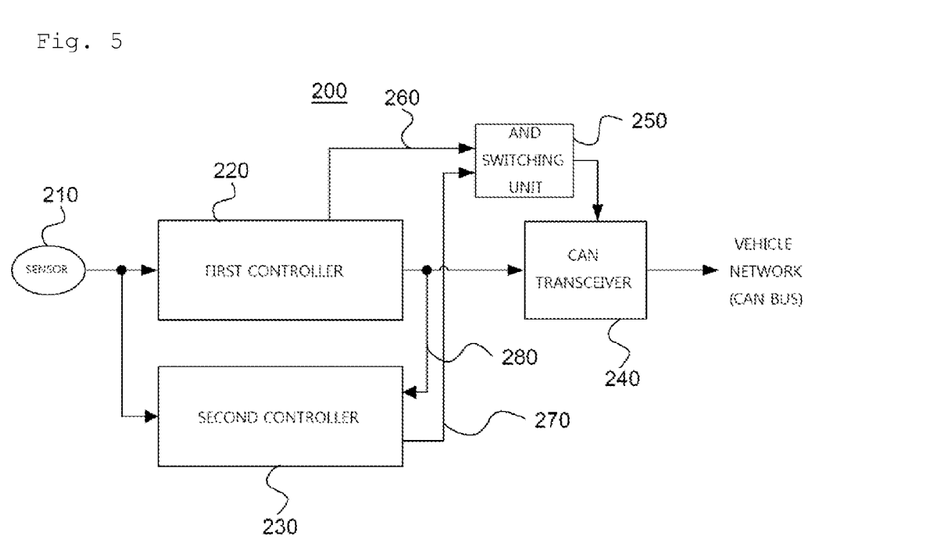
FIG. 5 is a schematic constitutional diagram of a dual controller system according to another exemplary embodiment of the present invention.
Figure 6:
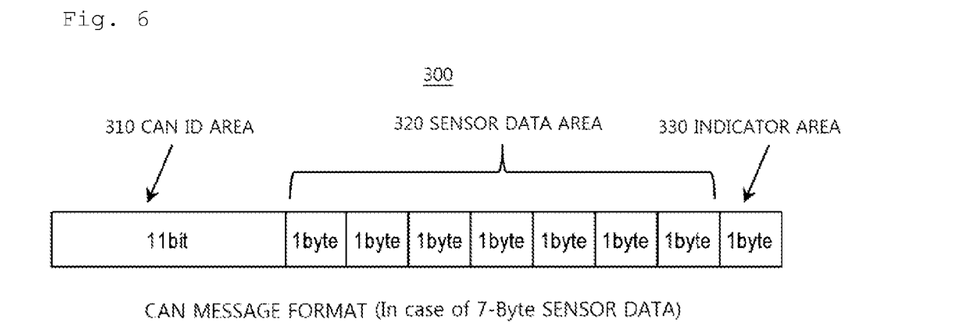
FIG. 6 is a schematic diagram to explain CAN message format including an indicator according to the another exemplary embodiment of the present invention.

FIG. 5 is a schematic constitutional diagram of a dual controller system according to another exemplary embodiment of the present invention, and FIG. 6 is a schematic diagram to explain CAN message format including an indicator according to the another exemplary embodiment of the present invention.

Referring to FIG. 5, an error detecting device 200 of the dual controller system according to the another exemplary embodiment of the present invention comprises a first controller 220, a second controller 230, a CAN transceiver 240 and an AND switching unit 250. The error detecting device 200 may further comprise a sensor 210, a first CAN transceiver control line 260, a second transceiver control line 270 and a feedback line 280.

Although, in this exemplary embodiment, a real time calculating system is described for computing a steering angle of a steering wheel in a vehicle, the present invention is not limited to the system but may also be applied to various error detecting devices adopting a dual controller system.

The sensor 210 may be embodied as an AMR (Anisotropic Magneto Resistance) sensor for sensing the steering angle of the steering wheel. The sensor 210 may be provided as plural and the first and the second controllers 220, 230 may receive sensing data from a plurality of sensors respectively.

The first controller 220 receives the sensing data from the sensor 210 and calculates and generates a first data. In this case, the first controller 220 generates the first data including the sensing data and an indicator. Then, the error of the input sensing data is detected. If the error is detected, the first off control signal is transmitted. For example, the error of the sensing data may be detected by checking if it deviates from a permitted limit through a predetermined number of samplings. As such an individual method for detecting the sensor error is widely known, its detail description is omitted.

Referring to FIG. 6, a CAN message format 300 according to this exemplary embodiment may comprise a CAN ID area 310 of 11 bytes, a sensor data area 320 of 7 bytes and an indicator area of 1 byte. As the indicator area is assigned to a partial area of the first data including the sensor sensing data, the second controller 330 to be described later can synchronize the first data and the second data and compare both synchronized data to perform accurate error detection.

The second controller 230 receives the sensing data from the sensor 210 and calculates and generates the second data. The second controller 230 may generates the second data according to a predetermined algorithm which is the same as that of the first controller 220. Also, the second controller 230 synchronizes the second data and the first data on the basis of the indicator included in the first data fed back from the first controller 220. Then, if the error is detected by comparing the second data with the first data, a second off control signal is transmitted.

The CAN transceiver 240 receives the first data from the first controller 220 and transmits it through CAN bus. That is, the CAN transceiver 240, as a data transmission device, transmits the final steering angle data where the error is not detected to the vehicle network.

The AND switching unit 250 outputs an interrupt signal, if at least one of the first and the second off control signals is received, to deactivate the CAN transceiver 240. For example, the AND switching unit 250 has characteristics of a AND logic gate and outputs the interrupt signal, if it receives an off control signal from at least one of the first controller 220 and the second controller 230, to deactivate the CAN transceiver 240 for preventing an output of wrong data.

A first CAN transceiver control line 260 is provided between the first controller 220 and the AND switching unit 250 to be a transmission line of the first off control signal.

A second CAN transceiver control line 270 is provided between the second controller 230 and the AND switching unit 250 to be a transmission line of the second off control signal.

A feedback line 280 diverges from an output terminal of the first controller 220 and is connected to the second controller 230 to be a transmission line for feeding back the first data to the second controller 230.

According to such an error detecting device of the dual controller system, each controller identifies an error of final data respectively without communication between the controllers. When there is an error in at least one controller, output transmission to the vehicle is controlled to prevent output of dangerous data having errors, so that stability and reliability of the data communication can be increased.

Figure 7:
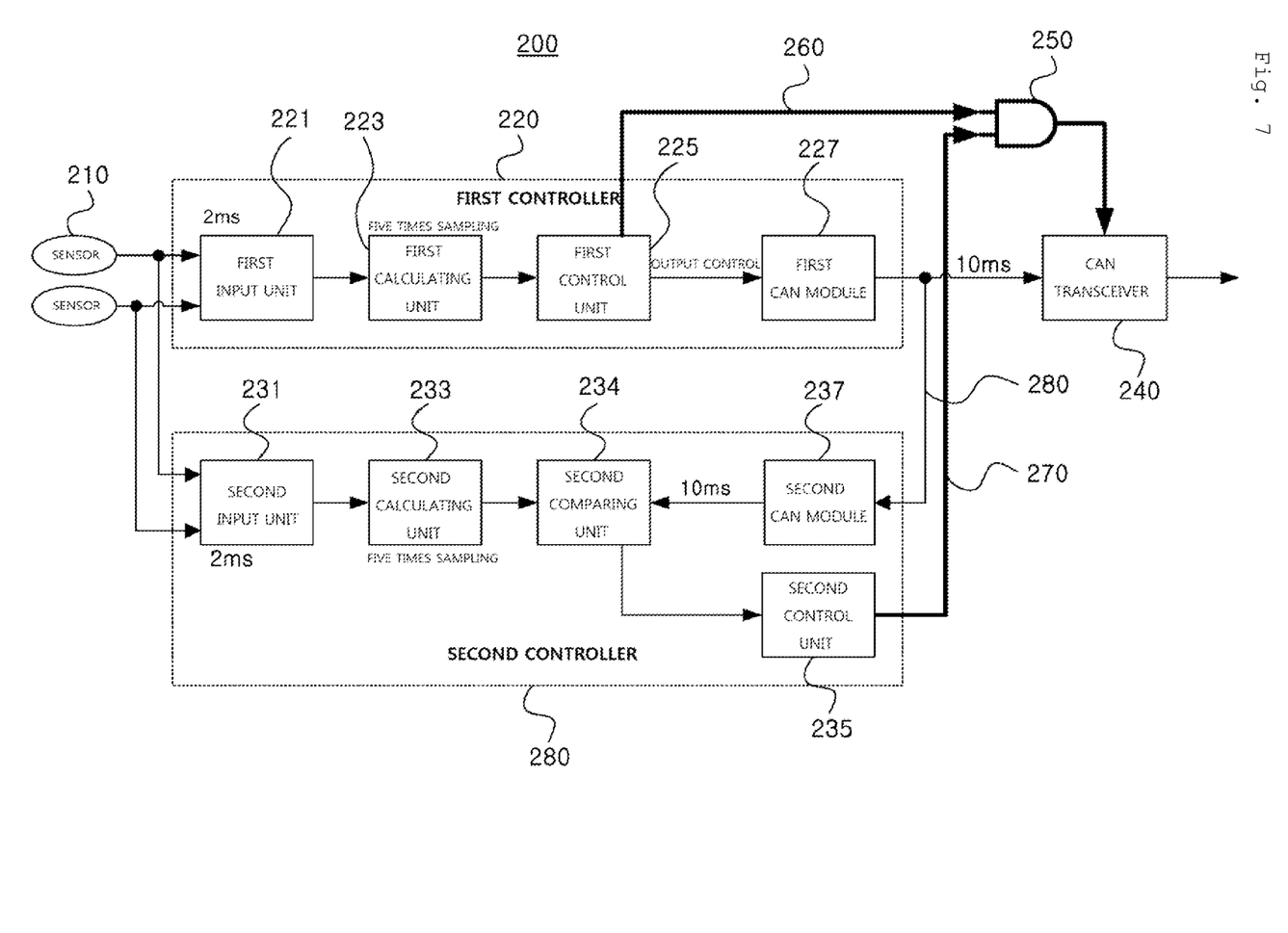
FIG. 7 is a detail constitutional diagram of the dual controller system according to the another exemplary embodiment of the present invention.

FIG. 7 is a detail constitutional diagram of the dual controller system according to the another exemplary embodiment of the present invention.

Referring to FIG. 7, the first controller 220 may comprise a first input unit 221, a first calculating unit 223, a first control unit 225 and a first CAN module 227.

The first input unit 221 receives the sensing data from the sensor 210 per first time unit. In this case, the first time unit may be 2 [ms].

The first calculating unit 223 receives the sensing data and calculates and generates the first data. That is, the first calculating unit 223 performs transforming the sensor value received from the sensor 210 through a calculating unit into data recognizable by the controller. Also, the first calculating unit 223 may generate the first data including the sensing data and the indicator.

The first control unit 225 detects the error by sampling the first data to predetermined times, and transmits the first off control signal to the AND switching unit 250 if the error is detected. However, if the error is not detected, the output control signal is transmitted to the first CAN module 227. That is, if the error is not detected from the first data, the first control unit 225 controls the first CAN module 227 for a normal output.

The first CAN module 227 operates according to the output control signal, processes the first data according to the CAN protocol and transmits the final data.

The second controller 230 may comprise a second input unit 231, a second calculating unit 233, a second comparing unit 234, a second control unit 235 and a second CAN module 237.

The second input unit 231 receives the sensing data from the sensor 210 per first time unit. In this case, the first time unit may be 2 [ms].

The second calculating unit 233 receives the sensing data and calculates and generates the second data. That is, the second calculating unit 223 performs transforming the sensor value received from the sensor 210 through a calculating unit into data recognizable by the controller.

The second comparing unit 234 synchronizes the first data and the second data on the basis of the indicator, and compares the synchronized second data and the first data to detect the error.

The second control unit 235, if the error is detected by the second comparing unit 234, transmits the second off control signal to the AND switching unit 250. That is, if the error is detected by comparing the second data and the fed back first data, the second controller 235 prevents the output of the CAN transceiver 240.

The second CAN module 237 processes the first data fed back from the first CAN module 227 and outputs it per second time unit. In this case, the second time unit may be 10 [ms]. That is, the second CAN module 237 performs contrarily to the data transforming process of the first CAN module 227 to provide the second comparing unit 234 with the transformed first data.

In this case, a first CAN transceiver control line 260 connects the first control unit 225 and a first input terminal of the AND switching unit 250 to provide a transmitting line of electrical signal, a second CAN transceiver control line 270 connects the second control unit 235 and a second input terminal of the AND switching unit 250 to provide a transmitting line of electrical signal, and a feedback line 280 feeds back the first data output from the first CAN module 227 to the second CAN module 237.

This exemplary embodiment is applied to SAS (Steering Angle Sensor) used in transmitting the steering angle to the vehicle and has its object of stopping the whole transmission in order not to transmit wrong information to the vehicle if the error occurs during operation and preventing malfunction of the vehicle by sensing abnormality from other systems using data of the SAS.

For example, the sensor values input from the two sensors are transformed by the calculating unit into data recognizable in the vehicle, and the output is transmitted from the CAN controller to the CAN transceiver by the output control of the MCU1. Lastly, the CAN transceiver transmits it to the vehicle network.

In this case, the information of a TX pin from the CAN controller of the MCU1 to the CAN transceiver is connected to a RX pin of the CAN controller of the MCU2. Then, the CAN controller of the MCU2 recognizes the value from the MCU1 instead of the input value from the CAN transceiver as the RX and transmits the data to the comparing unit. The MCU2 compares an initial sensor calculating data received from the calculating unit and the value received from the CAN controller to compare the accuracy of the data and decide if an accurate value is transmitted to the vehicle network. If there is an error, the interrupt is engaged to the CAN transceiver. When the comparing calculation of the MCU2 detects the error and engages the interrupt to the CAN transceiver even if the MCU1 operates normally and activates the control of the CAN transceiver to this end, a physical transmission to the vehicle network is prevented by AND gate.

In this case, it is required for reliability of the comparing decision that an original sensor calculating value for comparing by the MCU2 and the sensor data fed back from the MCU1 are recognized as the values measured at the same time. To this end, a recognizable indicator data is inserted at a part next to the area where the sensor value is used in the data value output by the MCU1, and is compared by the MCU2 for the synchronization. That is, when they are compared, the sensor measured data are synchronized and compared using the indicator of the data without direct synchronization of the MCU1 and the MCU2.

In detail, period of recognizing the sensor input value by the MCU1 and the MCU2 is as short as about 2 [ms]. The MCU1 takes and outputs an average value through five times recognition. The period of the transmission to the vehicle is 10 [ms], during which one data is transmitted. In this case, the MCU1 spares about 4 bits of the data area for the indicator with a counting of about 1~16 times and includes the indicator values in order and transmits the data. Also, the MCU2 applies and calculates the average value through the five times recognition, calculates the indicator value with a counting of about 1~16 times, and compares the data value received at the 10[ms] period with the indicator value to check if the compared values are the same. At this time, the counting of the indicator at the first stage is performed after the same interval of 100~200 [ms] for normal operations of the MCU1, 2 where electric power has already been applied. If the indicator is incorrect repeatedly during operation or due to calculation error of the interval time at the first stage, the MCU2 performs correction as follows.

First, if the indicator is incorrect by one time at the first stage, the recognized counting value from the MCU1 is recognized as that from the MCU2 and the counting afterward is performed. Then, the number of the five times sampling for the average of the sensor input values is synchronized to a MCU1 feedback time of 10 [ms] period from the counting for the indicator. At this time, the synchronization according to the data is set by decreasing or increasing the number of the five times sampling. If the synchronization is not set by the data within five times, or if the counting value of the indicator also has an error when the synchronization is to be set with an increase to ten times, a breakdown of the error is stored in the MCU and the CAN transceiver is deactivated.

Figure 8:
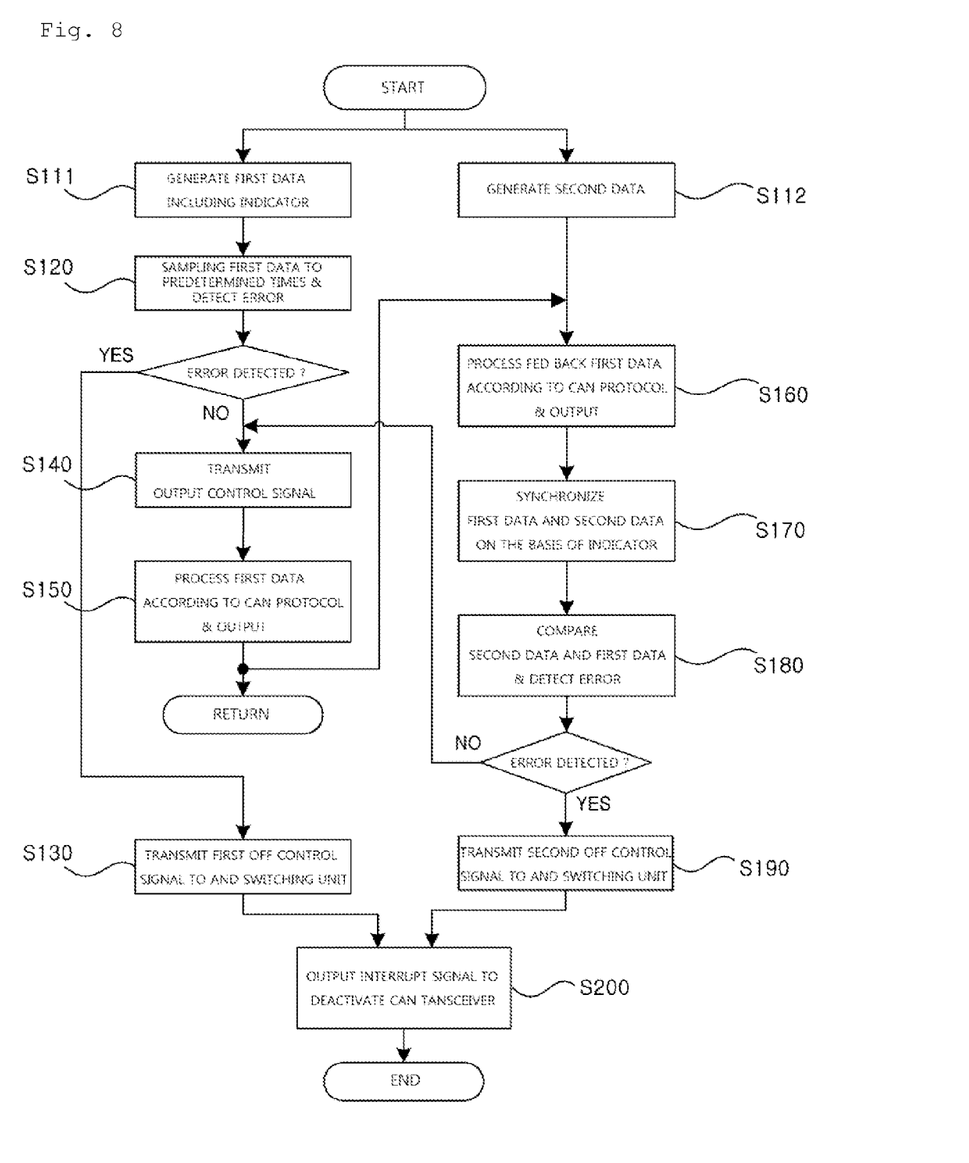
FIG. 8 is a flow diagram of an error detecting method of the dual controller system according to the another exemplary embodiment of the present invention.

FIG. 8 is a flow diagram of an error detecting method of the dual controller system according to the another exemplary embodiment of the present invention.

Referring to FIG. 8, according to the error detecting method of the dual controller system according to this exemplary embodiment of the present invention, firstly, the first input unit in the first controller receives the sensing data per the first time unit. Then, the first calculating unit 221 receives the sensing data from the sensor 210 and calculates and generates the first data including the indicator (S111). While the step S111 is performed, the second input unit in the second controller receives the sensing data from the sensor per the first time unit, and the second calculating unit 231 receives the sensing data from the sensor 210 and calculates and generates the second data (S112). In this case, the first time unit may be 2 [ms].

Next, the first control unit 225 performs sampling the first data to predetermined times to detect the error (S120). In this case, the sampling times may be five. If the error is detected at the step S120, the first control unit 225 transmits the first off control signal to the AND switching unit 250 (S130). If the error is not detected at the step S120, the first control unit 225 transmits the output control signal to the first CAN module 227 to normally output the first data (S140). Then, the first CAN module 227 operates according to the output control signal, processes the first data according to the CAN protocol and outputs it (S150).

Next, the second CAN module 237 processes the first data fed back from the first CAN module 227 and outputs it per the second time unit (S160). The second time unit may be 10 [ms]. The second comparing unit 234 synchronizes the first data and the second data on the basis of the indicator included in the first data (S170). Then, the second comparing unit 234 compares the synchronized second data and first data to detect the error (S180). Therefore, as the indicator area is assigned to a partial area of the first data which includes the sensing data, the second controller 230 can synchronize the first data and the second data, compare both synchronized data and perform the accurate error detection.

If the error is detected at the step S180, the second control unit 235 transmits the second off control signal to the AND switching unit 250 (S180). If the error is not detected at the step S120, a normal operation is maintained. That is, the first control unit 225 transmits the output control signal to the first CAN module 227 to normally output the first data (S140). In case of the normal output where the error is not detected, the steps return to S111 and S112 to repeat the above processes.

If the AND switching unit 250 receives at least one of the first and the second off control signals, it outputs the interrupt signal to deactivate the CAN transceiver 240 (S200). For example, the AND switching unit 250 has characteristics of a AND logic gate and outputs the interrupt signal, if it receives the off control signal from at least one of the first controller 220 and the second controller 230, to deactivate the CAN transceiver 240 for preventing an output of wrong data.

Although the exemplary embodiment of the present invention has been disclosed, various modifications, additions and substitutions are possible, without departing from the scope and spirit of the invention.

Industrial Applicability

The error detecting device and method of a dual controller system of the present invention divide modules constituting the controller into detail areas, and detect communication between controllers and final data output to outside together so that output transmission to the vehicle is controlled if an error occurs in the areas. Also, a risk factor generated due to the error is verified in duplication to prevent output of dangerous data having errors, so that stability and reliability of the output data can be increased.

Also, according to the error detecting device and method of a dual controller system of the present invention as described above, each controller identifies an error of final data respectively without communication between the controllers. When there is an error in at least one controller, output transmission to the vehicle is controlled to prevent output of dangerous data having errors, so that stability and reliability of the data communication can be increased.

The invention claimed is:

1. An error detecting device of a dual controller system comprising:
a first controller receiving a sensing data from a sensor to calculate and generate a first data and outputting a final data if an error is not detected by comparing the first data with a second data transmitted from a second controller;
a CAN transceiver receiving the final data from the first controller and transmitting the final data through a CAN bus; and
the second controller receiving the sensing data from the sensor to calculate and generate a second data and transmitting to the first controller an interrupt signal which prevents an output of the final data if an error is detected by comparing the second data with the final data fed back from the CAN transceiver, wherein:
the first controller comprises a first calculating unit which receives the sensing data and calculates and generates the first data, a first comparing and controlling unit which compares the first data with the second data to detect the error and transmits an output control signal to a first CAN module if the error is not detected, and the first CAN module which operates according to the output control signal, processes the first data according to a CAN protocol and transmits the final data; and
the second controller comprises a second calculating unit which receives the sensing data and calculates and generates the second data, a second CAN module which processes the final data fed back from the CAN transceiver according to the CAN protocol and transmits a third data, a second comparing unit which compares the second data with the first data transmitted from the first controller to detect the error and compares the second data with the third data transmitted from the second CAN module to detect the error, and a second control unit which transmits the interrupt signal to the first controller if the error is detected at the second comparing unit.

2. The error detecting device of a dual controller system according to claim 1, wherein the first comparing and controlling unit transmits the output control signal to the first CAN module if the error is not detected at the second comparing unit.

3. The error detecting device of a dual controller system according to claim 2 further comprising:
a first communication line connecting the first comparing and controlling unit and the second comparing unit to provide a transmitting line of an electrical signal;
a second communication line connecting the first CAN module and the second control unit to provide a transmitting line of an electrical signal; and
a feedback line feeding back the final data to the second CAN module.

4. The error detecting device of a dual controller system according to claim 1, wherein the sensor is provided as plural and the first and the second controllers receive the sensing data from the plural sensors respectively.

5. An error detecting method of a dual controller system comprising:
receiving a sensing data from a sensor to calculate and generate a first data by a first controller;
receiving a sensing data from the sensor to calculate and generate a second data by a second controller;
comparing the first data with the second data transmitted from the second controller by the first controller and outputting a final data if an error is not detected;
receiving the final data from the first controller and transmitting the final data through a CAN bus to a CAN transceiver; and
comparing the second data with the final data fed back from the CAN transceiver by the second controller and transmitting to the first controller an interrupt signal which prevents an output of the final data if an error is detected, wherein:
outputting the final data comprises comparing the first data and the second data by a first comparing and controlling unit to detect the error and transmitting an output control signal to a first CAN module if the error is not detected, and operating according to the output control signal by the first CAN module and processing the first data according to a CAN protocol to transmit the final data; and
transmitting the interrupt signal comprises processing the final data fed back from the CAN transceiver according to the CAN protocol by a second CAN module and transmitting a third data, comparing the second data with the first data transmitted from the first controller to detect the error by a second comparing unit and comparing the second data with the third data transmitted from the second CAN module to detect the error, and transmitting the interrupt signal to the first controller by the second control unit if the error is detected by the second comparing unit.

6. The error detecting method of a dual controller system according to claim 5, wherein transmitting the output control signal by the first comparing and controlling unit comprises transmitting the output control signal to the first CAN module if the error is not detected by the second comparing unit.

7. An error detecting device of a dual controller system comprising:
a first controller transmitting a first data including a sensing data received from a sensor and an indicator, identifying an error of the sensing data and transmitting a first off control signal if the error is detected;
a second controller generating a second data by calculating a sensing data received from the sensor, synchronizing the second data and the first data on the basis of the indicator included in the first data which is fed back from the first controller, and transmitting a second off control signal if the error is detected by comparing the synchronized second data with the first data;
a CAN transceiver receiving the first data from the first controller and transmitting it through a CAN bus; and
an AND switching unit outputting an interrupt signal to deactivate the CAN transceiver if at least one of the first and the second off control signals is input, wherein the first controller comprises a first input unit receiving the sensing data from the sensor per first time unit, a first calculating unit receiving the sensing data and calculating to generate the first data, a first control unit sampling the first data to a predetermined number of times to detect the error and transmitting the first off control signal to the AND switching unit if the error is detected, and a first CAN module operating according to an output control signal of the first control unit and processing and outputting the first data according to a CAN protocol.

8. The error detecting device of a dual controller system according to claim 7, wherein the second controller comprises a second input unit receiving the sensing data from the sensor per the first time unit, a second calculating unit receiving the sensing data and calculating to generate the second data, a second CAN module processing the first data fed back from the first CAN module according to the CAN protocol and outputting the first data per second time unit, a second comparing unit synchronizing the first data and the second data on the basis of the indicator and comparing the synchronized second data with the first data to detect the error, and a second control unit transmitting a second off control signal to the AND switching unit if the error is detected by the second comparing unit.

9. The error detecting device of a dual controller system according to claim 8, wherein the first control unit transmits the output control signal to the first CAN module if the error is not detected.

10. The error detecting device of a dual controller system according to claim 9 further comprising:
   a first CAN transceiver control line connecting the first control unit and a first input terminal of the AND switching unit to provide a transmitting line of the first off control signal;
   a second CAN transceiver control line connecting the second control unit and a second input terminal of the AND switching unit to provide a transmitting line of the second off control signal; and
   a feedback line feeding back the first data output from the first CAN module to the second CAN module.

11. The error detecting device of a dual controller system according to claim 7, wherein the sensor is provided as plural and the first and the second controllers receive the sensing data from the plural sensors respectively.

12. An error detecting method of a dual controller system comprising:
   transmitting a first data including a sensing data received from a sensor and an indicator, by a first controller, identifying an error of the sensing data and transmitting a first off control signal if the error is detected;
   generating a second data by calculating a sensing data received from the sensor, by a second controller, synchronizing the second data and the first data on the basis of the indicator included in the first data which is fed back from the first controller, and transmitting a second off control signal if the error is detected by comparing the synchronized second data with the first data;
   receiving the first data from the first controller by a CAN transceiver and transmitting it through a CAN bus; and
   outputting an interrupt signal by an AND switching unit to deactivate the CAN transceiver if at least one of the first and the second off control signals is input, wherein transmitting the first off control signal by the first controller comprises receiving the sensing data by a first input unit from the sensor per first time unit, receiving the sensing data by a first calculating unit and calculating to generate the first data including the indicator, sampling the first data by a first control unit to a predetermined number of times to detect the error and transmitting the first off control signal to the AND switching unit if the error is detected, and operating by a first CAN module according to an output control signal of the first control unit and processing and outputting the first data according to a CAN protocol.

13. The error detecting method of a dual controller system according to claim 12, wherein transmitting the off control signal by the second controller comprises receiving the sensing data by a second input unit from the sensor per the first time unit, receiving the sensing data by a second calculating unit and calculating to generate the second data, processing the first data fed back from the first CAN module according to the CAN protocol by a second CAN module and outputting the first data per second time unit, synchronizing the first data and the second data on the basis of the indicator by a second comparing unit and comparing the synchronized second data with the first data to detect the error, and transmitting a second off control signal to the AND switching unit by a second control unit if the error is detected by the second comparing unit.

14. The error detecting method of a dual controller system according to claim 13 further comprising transmitting the output control signal to the first CAN module by the first control unit if the error is not detected.

* * * * *